US00RE34817E

United States Patent [19]

Luciani

[11] E Patent Number: Re. 34,817

[45] Reissued Date of Patent: Jan. 3, 1995

[54] METHODS AND APPARATUS FOR WINDING TWO-POLE ELECTRIC MOTOR STATORS

[75] Inventor: Sabatino Luciani, Sesto Fiorentino, Italy

[73] Assignee: Axis S.p.A., Florence, Italy

[21] Appl. No.: 995,147

[22] Filed: Dec. 22, 1992

Related U.S. Patent Documents

Reissue of:

[64] Patent No.: 4,982,908
Issued: Jan. 8, 1991
Appl. No.: 304,026
Filed: Jan. 31, 1989

[30] Foreign Application Priority Data

Sep. 16, 1988 [IT] Italy ..... 67823 A/88

[51] Int. Cl.[6] ..... H02K 15/085
[52] U.S. Cl. ..... 242/1.1 R
[58] Field of Search ..... 242/1.1 R, 1.1 A, 1.1 E; 29/596, 605

[56] References Cited

U.S. PATENT DOCUMENTS

| | | | |
|---|---|---|---|
| Re. 25,281 | 11/1962 | Moore | 242/1.1 R |
| 3,345,001 | 10/1967 | Straub et al. | 242/1.1 R |
| 3,412,947 | 11/1968 | Reichert et al. | 242/1.1 R |
| 3,648,938 | 3/1972 | Dryburgh | 242/1.1 E |
| 3,903,593 | 9/1975 | Mason | 29/605 |
| 4,483,433 | 11/1984 | Fischer et al. | 198/339 |
| 4,635,865 | 1/1987 | Arnold | 29/605 |
| 4,658,492 | 4/1987 | Kieffer | 29/596 |
| 4,679,312 | 7/1987 | Nussbaumer | 242/1.1 R |
| 4,732,338 | 3/1988 | Eminger | 242/1.1 R |

*Primary Examiner*—Katherine Matecki
*Attorney, Agent, or Firm*—Fish & Neave

[57] ABSTRACT

A machine for winding two-pole electric motor stators has a housing for holding the stator during winding. Winding forms are pressed against both ends of the stator and clamped to the housing. The clamping structure is partly operated by the structure which presses the winding forms against the stator so that the clamping structure automatically compensates for differences in stator dimension parallel to the axis along which the winding forms are pressed against the stator.

30 Claims, 8 Drawing Sheets

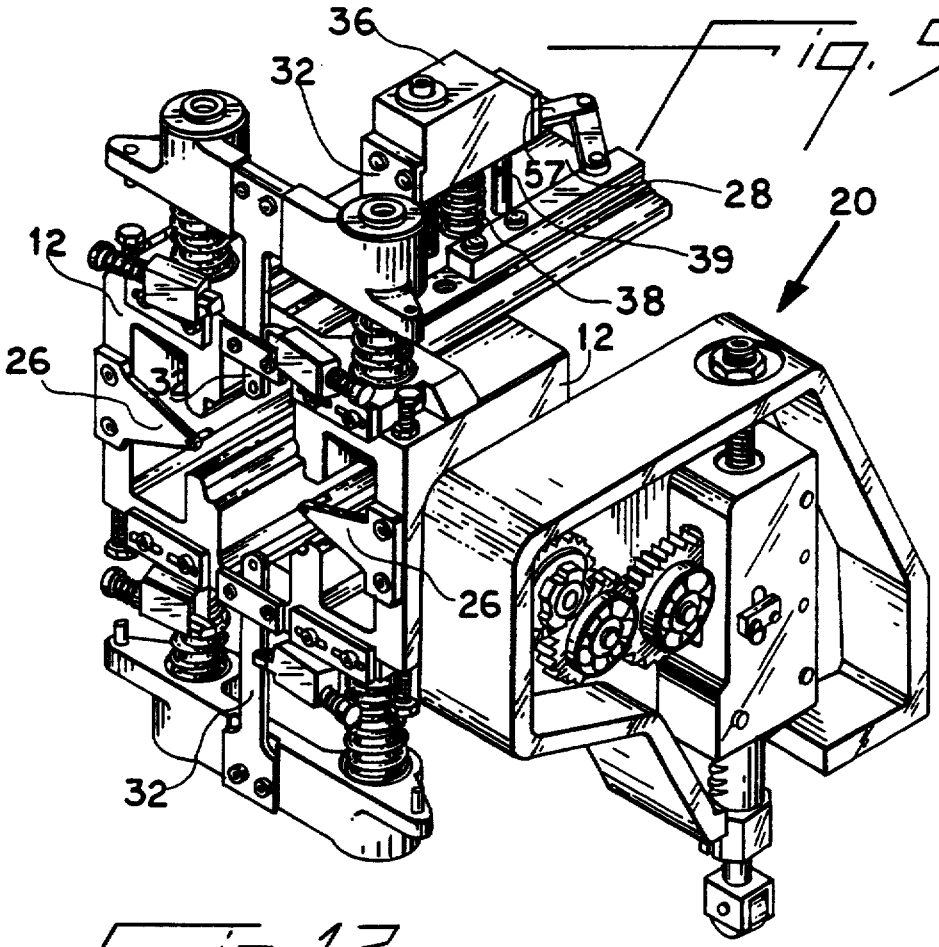
Fig. 5
Fig. 12
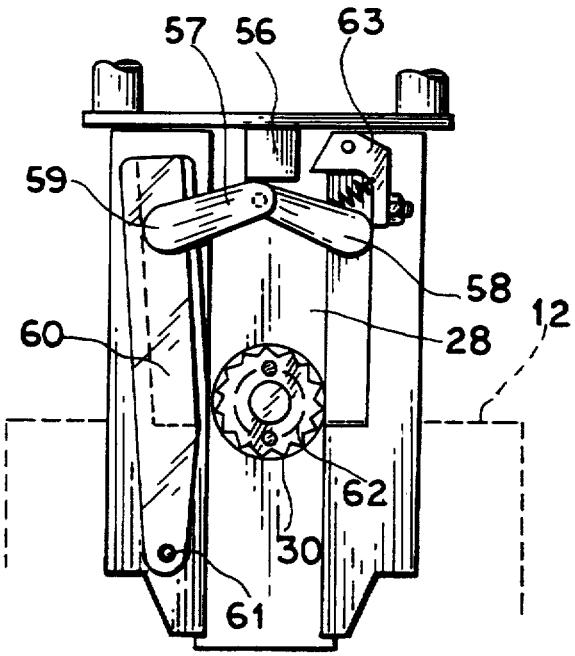
Fig. 7a
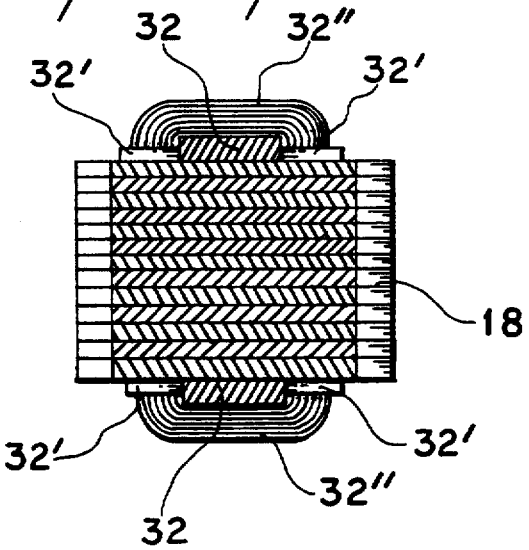

21
55
23
40
27
27
42
42
41
X
34
34
A
VII
62
30
24
62
56
30
57
57
64
VII
25
38
38
28
28
18

METHODS AND APPARATUS FOR WINDING TWO-POLE ELECTRIC MOTOR STATORS

Matter enclosed in heavy brackets [ ] appears in the original patent but forms no part of this reissue specification; matter printed in italics indicates the additions made by reissue.

BACKGROUND OF THE INVENTION

This invention relates to methods and apparatus for winding two-pole stators for electric motors. The machines which make use of this invention employ wire-guiding winding forms which are clamped to the stator during winding. Because stators may have different core heights, the methods and apparatus of this invention automatically position the winding forms and clamps to accommodate any core height.

In the machines presently used for winding electric motor stators, the winding forms typically comprise two half-forms fitted together (e.g., a male half having two pins and a female half having two holes respectively engaged by the pins of the male half). The two half forms, coupled together, form one element through which winding form clamps pass in order to pull the winding forms against the stator and lock the stator inside a housing which supports the stator during winding and other processing.

In the prior art machines the position of the clamps is usually adjusted manually from the front of the stator according to the height of the stator core so that the winding forms engage one another and the clamps by means of a central pin. The clamps then lock the winding forms against the stator, and therefore also against the stator housing containing said stator, by means of a mechanical operator.

In view of the foregoing, it is an object of this invention to provide simplified and improved methods and apparatus for winding electric motor stators.

It is a more particular object of this invention to provide methods and apparatus for winding electric motor stators which do not require all of the operations presently necessary to change the positions of the winding forms and clamps according to the core height of the stators being wound.

SUMMARY OF THE INVENTION

These and other objects of the invention are accomplished in accordance with this invention by providing winding machines and methods for two-pole stators employing universal wire-guiding winding forms and clamps positioned automatically for any stator core height. The machines of this invention are preferably of the type in which the stator is housed in a pivotable housing supported by a cross piece rotating about a vertical axis in order to sequentially bring the housing to the loading and unloading station, the winding station, and the wire terminating station. A vertical slide is equipped with means for holding and positioning the winding forms onto the stator at the loading and unloading station. The means for holding and positioning is connected to (1) first means for stopping the slide on the stator whatever its core height, and (2) second means, located at a predetermined distance from said first stopping means, for moving integral with said slide third means for holding clamps able to lock the winding forms inside the stator. The third means maintains its position of hooking the clamps to the winding forms even after the slide has released the winding forms. The apparatus further includes fourth means for inserting and releasing the clamps inside openings in the stator during engaging and disengaging of the winding forms inside the stator, and fifth means to disengage the clamp holding means, said fifth means being actuated after insertion of the winding forms into and before their removal from the stator so as to bring the clamp holding means back into home position.

Further features of the invention, its nature and various advantages will be more apparent from the accompanying drawings and the following detailed description of the preferred embodiments.

BRIEF DESCRIPTION OF THE DRAWINGS

FIG. 5 is a perspective view of a portion of the apparatus shown in FIGS. 3 and 4.

FIG. 7a is a sectional view taken along the line C—C in FIG. 7.

FIG. 12 is a schematic view of the detail shown in FIG. 9 in a different operating position.

DETAILED DESCRIPTION OF THE PREFERRED EMBODIMENTS

In Italian Pat. application No. 67196 A/88, filed Mar. 10, 1988, the assignee of the present application disclosed a two-pole stator winder comprising a revolving table fixed to a base plate and rotating about its vertical axis. At least three equidistant working stations are placed radially in front of the table. These stations include (1) a station for loading the stator winder with an unwound stator from a conveyor system situated at one side of the machine and unloading the wound stator back onto the conveyor, (2) a winding station where one or more needles with alternate translational and angular motion provide for winding of the stator, and (3) at least one terminating station where manipulators terminate the leads to the stator. The revolving table, according to the present invention, is equipped with a plurality of stator housings. The distance between the stator housings is the same as the distance between the working stations. Each stator housing has a stator seat. The revolving table and the stator housings have mechanical means for bringing each stator housing (1) from a vertical orientation to a horizontal orientation as the stator housing moves from the loading and unloading station to the winding station, and (2) back to the vertical orientation as the stator housing moves from the terminating station to the loading and unloading station. The housings also have elastic means for keeping them in a horizontal orientation during their travel from the winding station to the terminating station(s). However, the machine shown in the No. 67196 A/88 application does not employ winding forms because that machine uses a type of winding needle motion which makes winding forms unnecessary.

Figure 1:
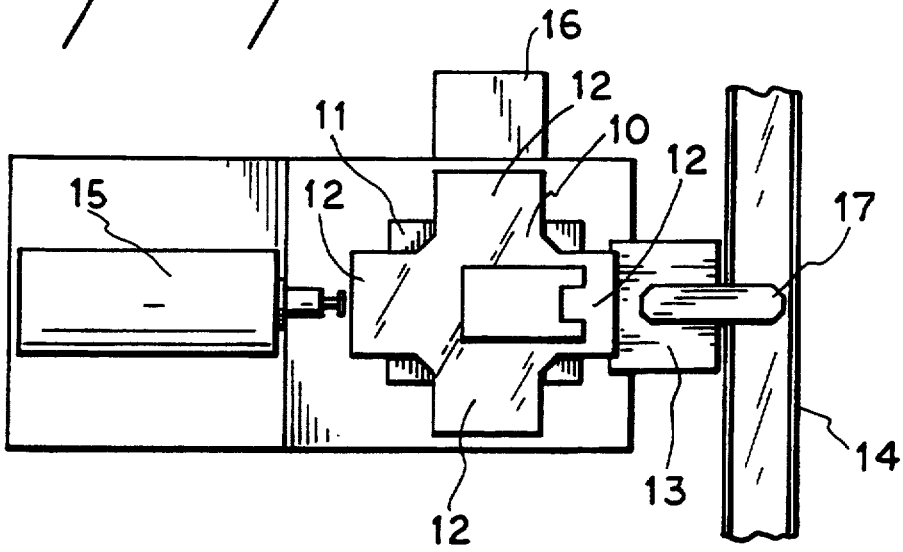
FIGS. 1 and 2 are schematic top plan views of two different illustrative embodiments of this invention.
Figure 2:
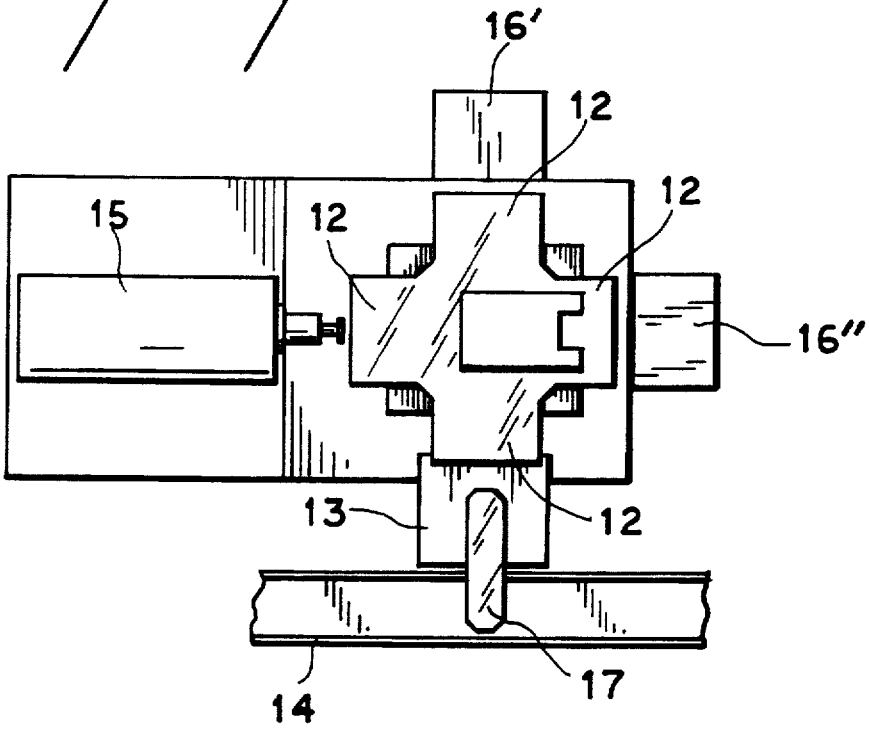

The configuration of the machines which are the subject of this invention is generally similar to the machine shown in the 67196 A/88 application. Thus, as shown in FIGS. 1 and 2 herein, the machines of this invention typically have a revolving table 10 fitted to base 11 on which stator housings 12 are arranged crosswise. One such stator housing is shown in FIG. 5.

The embodiment shown in FIG. 1 has a loading station 13 in front of a conveyor 14, a winding station 15, and a terminating station 16. The alternative embodiment shown in FIG. 2 also has a loading station 13 in front of a conveyor 14 and a winding station 15, but in addition it has two terminating stations 16' and 16" instead of only one such station as in FIG. 1.

Figure 3:
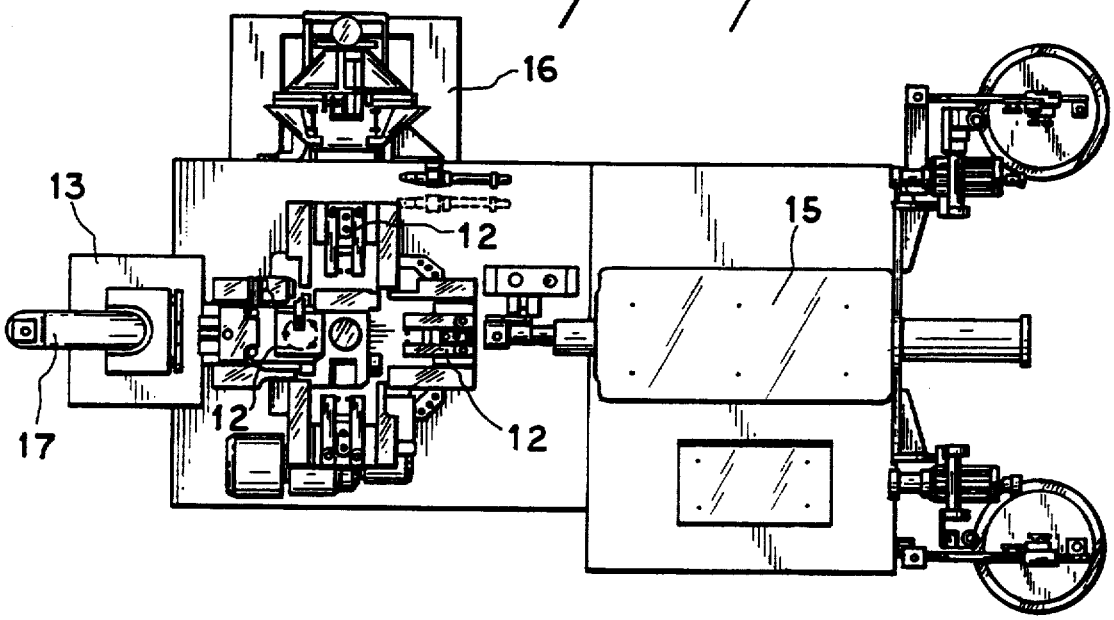
FIGS. 3 and 4 are, respectively, a top plan view and a side elevational view of another illustrative embodiment of the invention. Some of the elements shown in FIG. 4 have been removed for clarity in FIG. 3.
Figure 4:
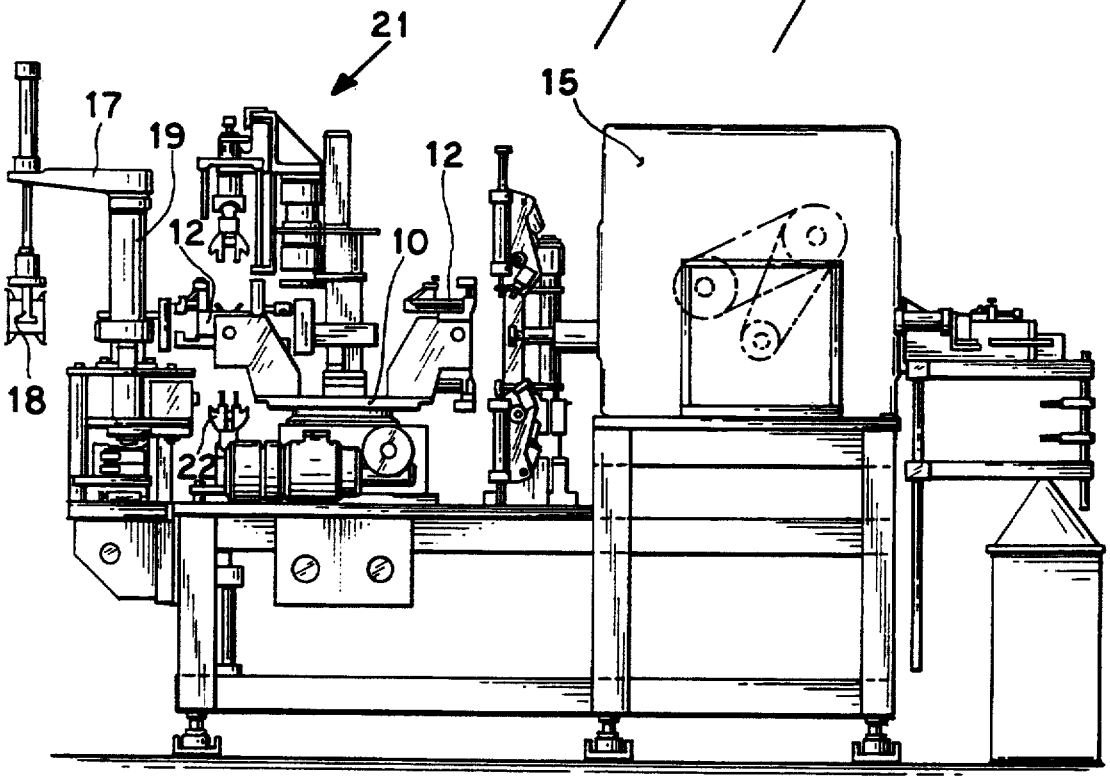

As can be seen in FIGS. 3 and 4, a stator housing 12 presents itself at loading and unloading station 13 with its axis vertical so as to allow arm 17 to pick up a stator 18 from conveyor 14, rotate around fulcrum 19, and place the stator inside the stator housing 12.

At the following winding station 15 and terminating station 16 the stator housings 12 have been pivoted 90 degrees so that their axes are horizontal, permitting processing of the stator. In the case where two terminating stations 16' and 16" are provided (see FIG. 2), the stator housing 12 can be rotated 180 degrees in traveling between stations 16' and 16". Downstream of the terminating station(s) the stator housing 12 is again pivoted 90 degrees to bring its axis back into vertical alignment in front of loading and unloading station 13.

The kinematic systems which may be employed for the above-mentioned 90 degree and 180 degree rotations of each housing 12 according to the working station it encounters during revolution of table 10 have been described in detail in Italian application No. 67196 A/88 and therefore need not be described again here, but will simply be illustrated by one typical embodiment 20 shown in FIG. 5.

FIG. 4 shows in the center of the machine, fixed to revolving table 10, an assembly 21 for the insertion/-removal of the upper half winding forms into/from the stator 18 inside housing 12 in front of loading and unloading station 13. A similar (but simpler) assembly 22 is located under the machine base for insertion/removal of the lower half winding forms. When arm 17 rotates 180 degrees from the position shown in FIG. 4 in order to bring stator 18 into housing 12, assembly 21 revolves around its vertical axle fixed to table 10 so as to remove assembly 21 out of the way of arm 17. When arm 17 returns over conveyor system 14, assembly 21 rotates back into working position over stator housing 12 which now contains stator 18.

Slide 23 (FIG. 6), actuated by a suitable cylinder, descends until stopping means 24 encounters the upper surface 25 of stator 18. (Note that stator housing 12 has been completely omitted for clarity in FIG. 6.) The other surface of stator 18 rests on reference points 26 (FIG. 5) of vertically oriented stator housing 12. Two rods 27, fixedly attached to each other and to slide 23, are located at an adjustable [able] distance x from stopping means 24 and move together with slide 23. As slide 23 moves down, each rod 27 encounters a slide 28 (mounted on housing 12 as shown, for example, in FIG. 5) and pushes it downward. A typical slide 28 is better illustrated in FIGS. 8–11.

Figure 8:
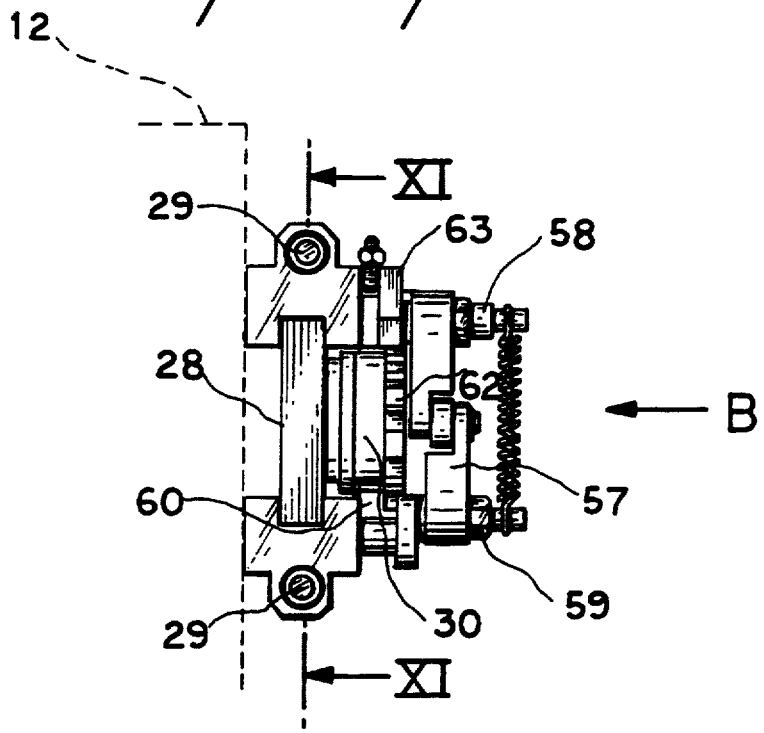
FIG. 8 is a partial top plan view of detail A in FIG. 6.
Figure 11:
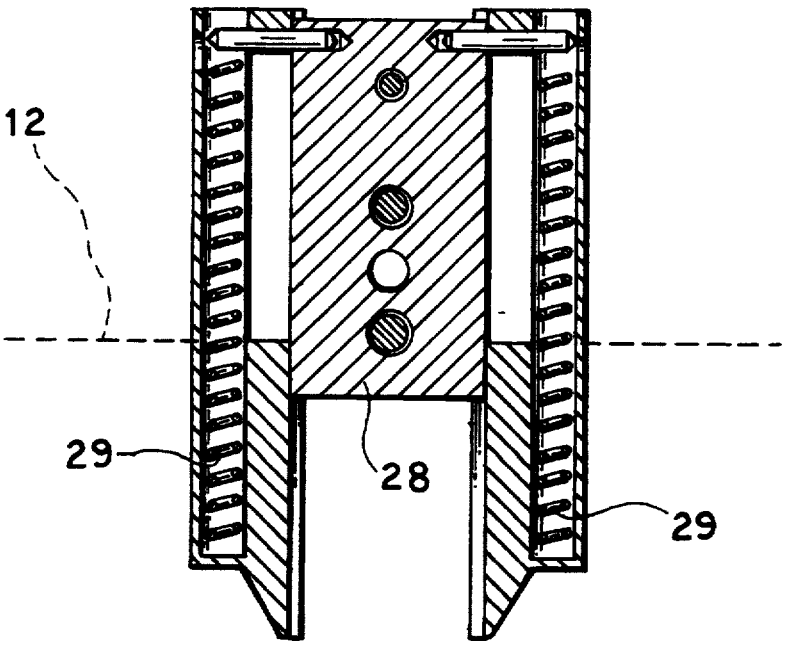
FIG. 11 is an elevational view taken along the line XI—XI in FIG. 8.
Figure 9:
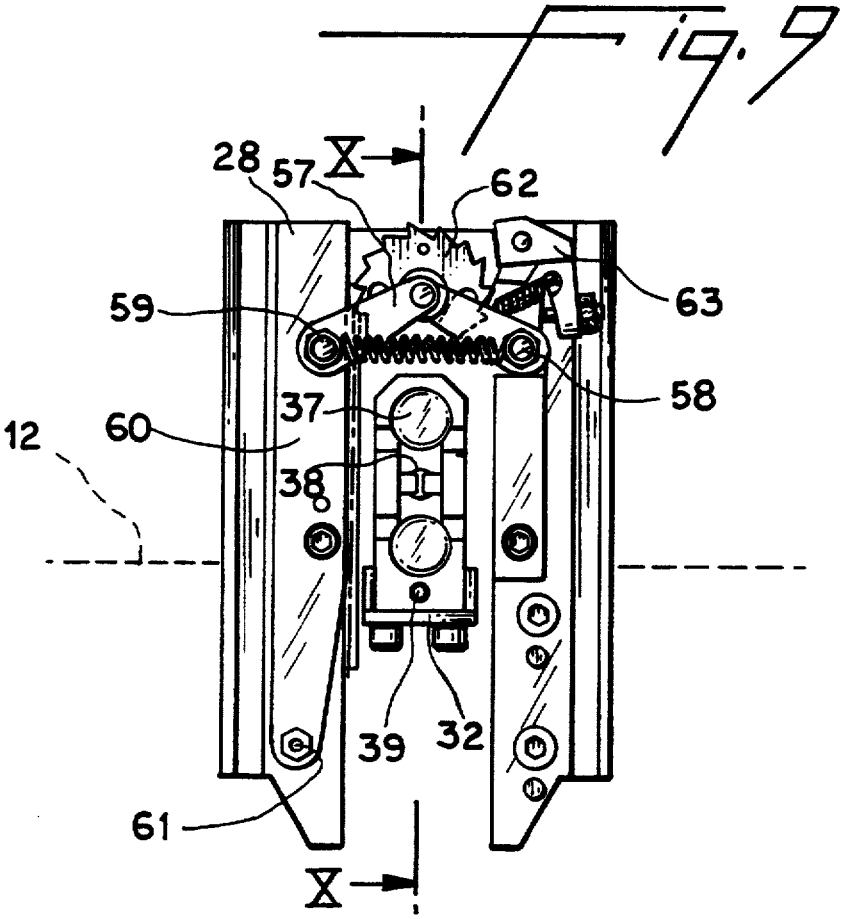
FIG. 9 is a partial elevational view taken along the line B in FIG. 8.
Figure 10:
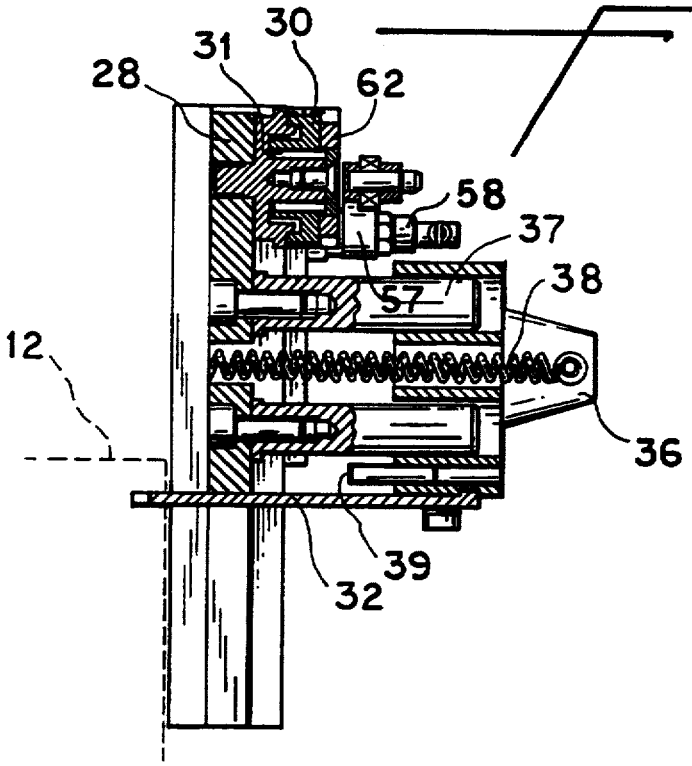
FIG. 10 is an elevational sectional view taken along the line X—X in FIG. 9.

As each slide 28 is pushed downward by a rod 27, the slide compresses springs 29 (FIGS. 8 and 11) and sets to rotation gear 30 (FIGS. 8 and 10) which engages stationary rack 60 (FIGS. 8 and 9). Gear 30 is equipped with a one-way clutch or bearing 31 (FIG. 10) which prevents gear 30 from rotating in the direction opposite to the rotation produced by the descent of slide 28, thus preventing the slide from returning spontaneously upward when rod 27 no longer presses against slide 28.

In this way, when stopping means 24 contacts stator surface 25 (whatever its position, i.e., whatever the stator core height), slide 28 will have moved downward so that its clamp 32 (FIGS. 9 and 10) is lined up with opening 33 (FIG. 13) in winding form 34. At this point, cylinder 64 (FIG. 6) moves assembly 64' (FIG. 7) forward until stopping means 39 (FIG. 10) encounters slide 28. This causes clamp 32 to enter opening 33. A cylinder 64" (FIG. 7) is fixed to assembly 64 and pivotally attached to lever 35, which lever is pivotally attached to assembly 64'. Cylinder 64" disengages lever 35 from head 36, thereby permitting spring 38 (FIG. 10), which is stretched between head 36 and slide 28, to hold clamp 32 in opening 33. (Note that elements 64, 64', 64", and 35 are duplicated to the right of the apparatus shown in FIGS. 6 and 7 so that the slide assemblies on both sides of stator housing 12 are controlled in the same way.)

Figure 7:
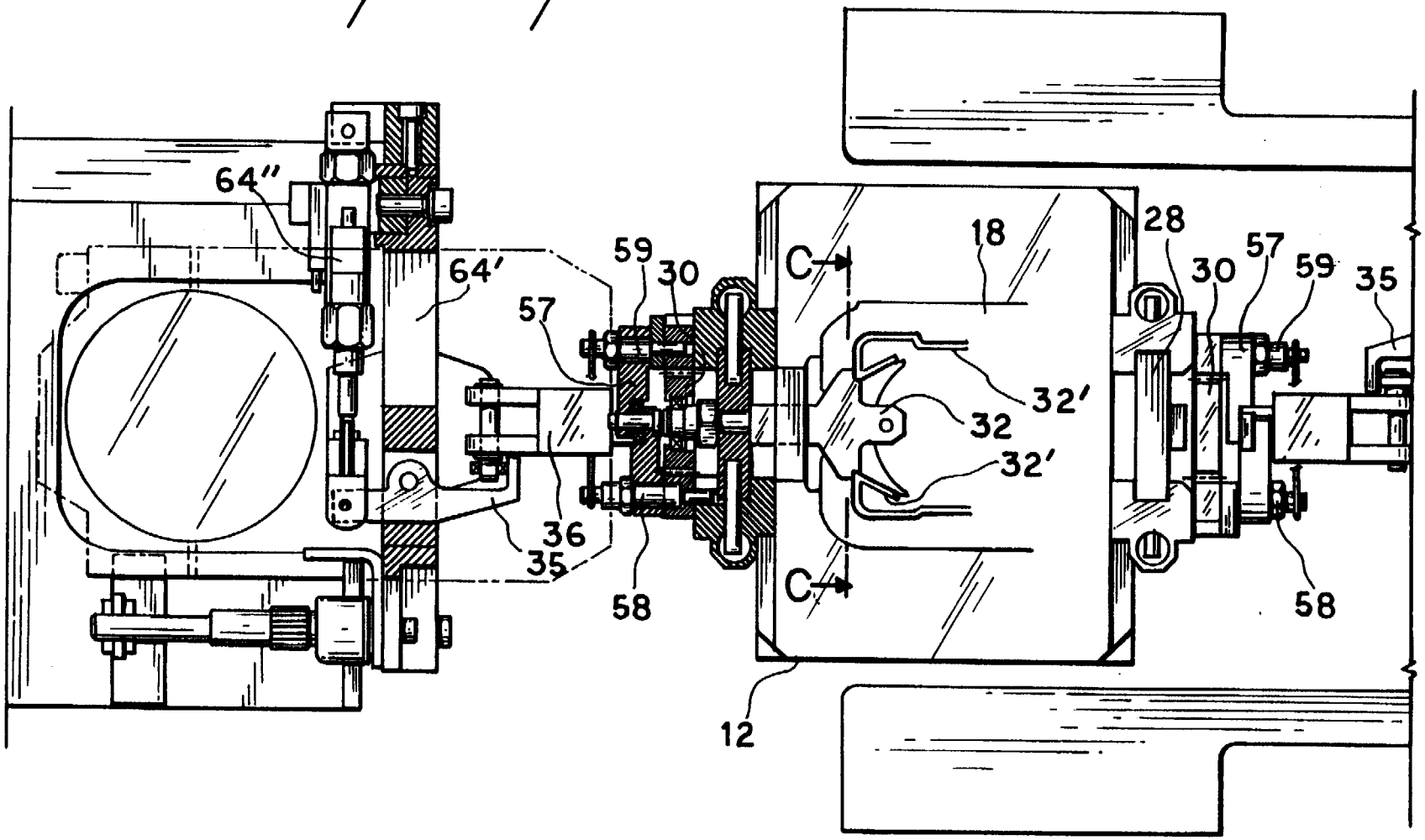
FIG. 7 is a partial sectional plan view taken generally along the line VII—VII in FIG. 6.

As can be seen in FIG. 7, clamps 32 are shaped so as to protect the stator insulating material 32' (typically paper) from the winding wire during winding. This is better illustrated in FIG. 7a where copper wire coil 32" is shown resting on clamp 32 instead of on the ends of insulating papers 32'.

Figure 6:
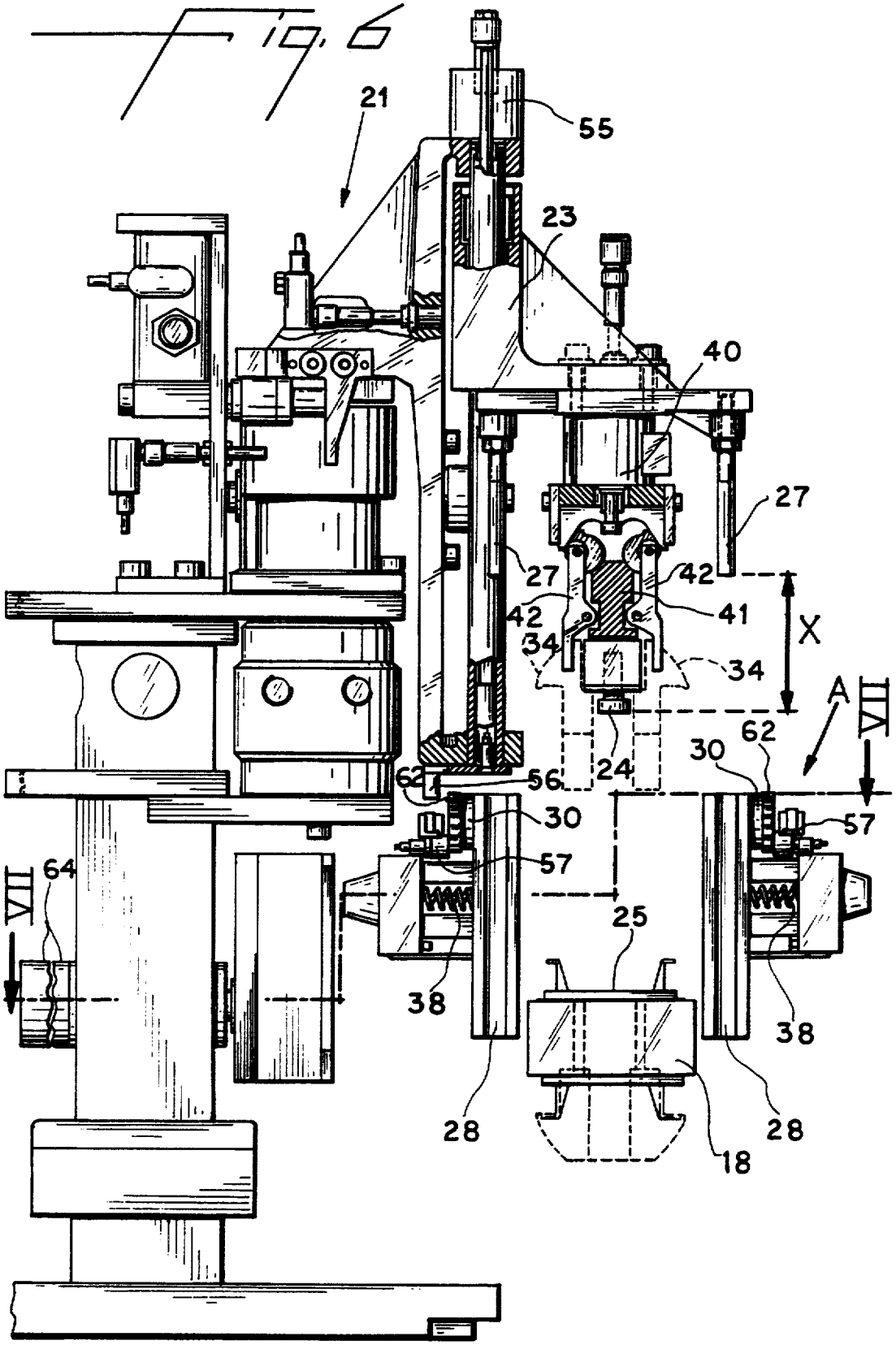
FIG. 6 is a partly sectional, side elevational view of a portion of the apparatus shown in FIG. 4. Note that for clarity, stator housing 12 is entirely omitted in FIG. 6.
Figure 13:
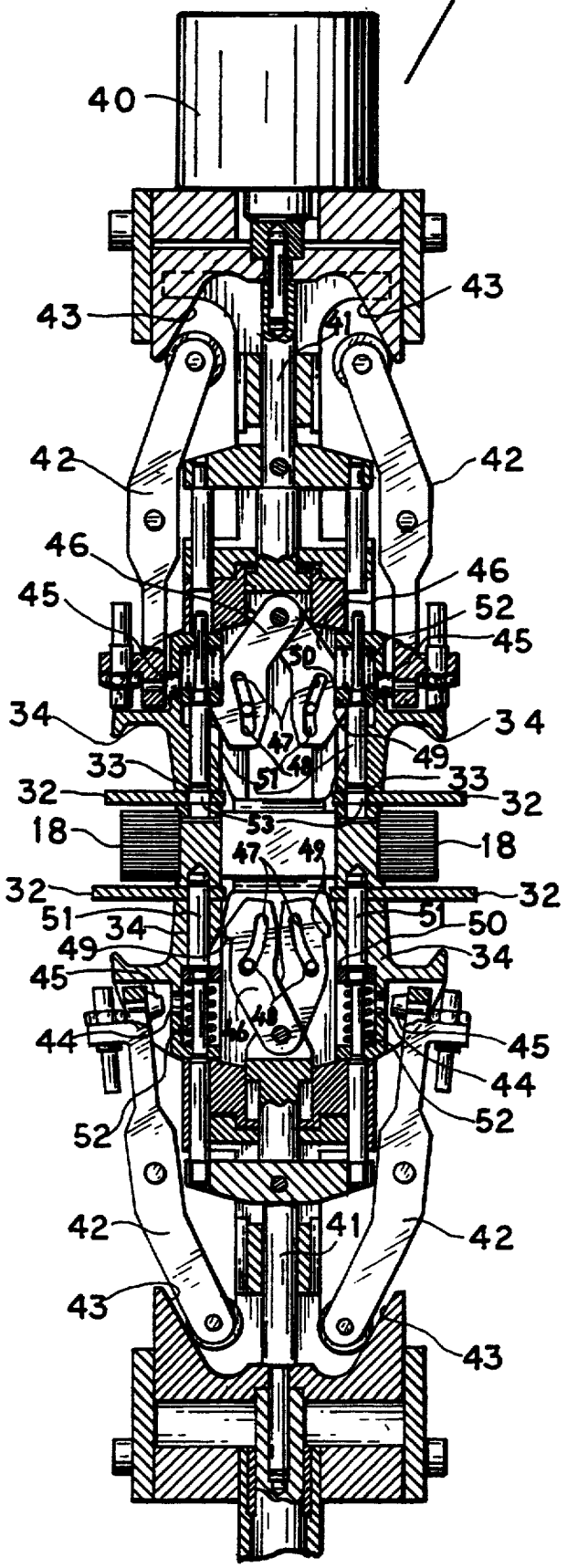
FIG. 13 is a partly sectional, elevational view of the winding forms and apparatus for positioning them inside the stator.

The upper portion of FIG. 13 illustrates the condition just described with clamps 32 inserted inside openings 33 of winding forms 34 which have already been lowered into stator 18 by slide 23 (FIG. 6). Now cylinder 40 moves rod 41, as illustrated in the lower portion of FIG. 13. In this way levers 42, moving along inclined sidewalls 43, open out and their tips 45 leave recesses 44 in winding forms 34. Winding forms 34 are therefore no longer held by assembly 21 (or 22 in the case of the portion of the apparatus below the stator). Rod 41 likewise moves inner levers 46. Levers 46 have slots 47 engaged by pegs 48. In this way levers 46 pivot until their free ends meet, so that their edges 49 disengage from heads 50 of pins 51. Pins 51, pushed by springs 52, move in apertures in winding forms 34 and pass through borings 53 in clamps 32. In this way clamps 32 and windings forms 34 are locked together and locked to stator 18. Slide 23, now without winding forms 34, returns to its home position shown in FIG. 6.

The revolving table now brings housing 12 with stator 18 and its winding forms 34 to winding station 15 and, after winding, to terminating station 16 or terminating stations 16' an 16" as described above. When stator 18 has been terminated, it returns to loading and unloading station 13 for removal of winding forms 34 before it can be returned to conveyor system 14. In order to remove winding forms 34, slide 23 is lowered until stopping means 24 contacts the surface 25 of stator 18. Now cylinder 40 causes levers 42 to engage winding forms 34 by means of projections 45, and also causes levers 46 to pull pins 51 through borings 53 out of clamps 32.

Cylinder 64 (FIG. 6) pushes forward assembly 64' until lever 35 engages head 36, retracting it and pulling clamps 32 out of winding forms 34 through holes 33.

Because winding forms 34 are now free of clamps 32, slide 23 (with winding forms 34) returns back into the position illustrated in FIG. 6. A similar operation is carried out by assembly 22 (FIG. 4) which brings the lower half-forms down.

With slide 23 in the upper position, cylinder 55 (FIG. 6) moves rods 56 downwards. (Although only one rod 56 is shown in FIG. 6, it will be understood that there is another similar rod which acts on the right-hand slide assembly 28 as viewed in that FIG.) As can be seen in FIG. 12, each rod 56 pushes on the toggle 57 of the associated slide assembly 28. Toggle 57 is pivotally attached to fixed pivot 58 and at 59 to rack 60 which is pivotally attached to fixed point 61. As toggle 57 is straightened out by rod 56, rack 60 disengages from gear 30, thereby permitting slide 28 to be pushed up by springs 29. Now slide 28 is in its home position (shown in FIG. 6) waiting for a new stator. Rod 56 is then returned to its home position.

In order to prevent rack 60 from accidentally hitting or clashing with a tooth or gear 30 when the rack again engages gear 30 for processing a new stator, gear 30 carries saw-toothed wheel 62. An elastic catch 63 (FIGS. 8 and 9) positions gear 30 in [in] its home position in such a way as to avoid the possibility of interference of the gear teeth with the rack.

The machine described above permits the winding of stators with different core heights with the aid of winding forms and without the need for manual adjustments at the station where the winding forms are applied to the stator. In particular, it is stopping means 24 which determines the stoppinq position of slide 23 according to the stator core height, while in consequence rods 27 bring slide 28 into the exact position for inserting clamping means 32 into apertures 33. If the above assembly determining the position of the winding forms and of the clamping means according to the stator core height is controlled by electronic systems, it may pass the positioning information to the control system of the machine which in turn may use that information for a completely automated changing from one stator core height to another.

I claim:

1. Apparatus for use in winding an electric motor stator of hollow, substantially cylindrical shape, said stator having a central longitudinal axis and first and second annular surfaces substantially perpendicular to said longitudinal axis at respective opposite ends of the cylindrical shape, said apparatus comprising:

a [housing for holding] *structure external to* the stator;

first means for respectively pressing first and second winding forms against said first and second annular surfaces;

second means mounted on said [housing] *structure* for releasably securing said first winding form where, relative to said stator, said first means presses said first winding form against said first annular surface;

third means for releasably securing said second winding form where, relative to said stator, said first means presses said second winding form against said second annular surface; and means for allowing said second and third means to move relative to one another substantially parallel to said longitudinal axis so that said apparatus adjusts to various stator dimensions parallel to said longitudinal axis.

2. The apparatus defined in claim 1 wherein said first means includes:

resilient means for pressing said first winding form against said first annular surface so that said first means automatically adjusts to various stator dimensions parallel to said longitudinal axis.

3. The apparatus defined in claim 2 wherein said first means moves said first winding form substantially parallel to said longitudinal axis in order to press said first winding form against said first annular surface, wherein said second means includes clamp means movable relative to said [housing] *structure* substantially parallel to said longitudinal axis, and wherein said first means includes coupling means for causing said clamp means to move with said first winding form as said first means moves said first winding form to press said first winding form against said first annular surface, said second means further including fourth means for releasably retaining said clamp means in the position parallel to said longitudinal axis to which said clamp means is moved by said coupling means.

4. The apparatus defined in claim 3 wherein said first winding form includes a latching surface transverse to said longitudinal axis, and wherein said clamp means includes a clamp member movable relative to said [housing] *structure* transverse to said longitudinal axis for selectively engaging said latching surface to releasably secure said first winding form in said position relative to said stator in which said first means presses said first winding form against said first annular surface.

5. The apparatus defined in claim 4 further comprising:

fifth means for controlling the position of said clamp member transverse to said longitudinal axis.

6. The apparatus defined in claim 5 wherein said fourth means comprises:

sixth means disposed on said second means for resiliently urging said clamp member to move into engagement with said latching surface; and seventh means for selectively causing said clamp member to move out of engagement with said latching surface.

7. The apparatus defined in claim 3 further comprising:

eighth means for selectively releasing said fourth means.

8. The apparatus defined in claim 7 wherein said second means further comprises:

ninth means for resiliently urging said clamp means to remain in a home position which is its position prior to displacement by said coupling means.

9. The method of winding an electric motor stator of hollow, substantially cylindrical shape, said stator having a central longitudinal axis and first and second annular surfaces substantially perpendicular to said longitudinal axis at respective opposite ends of the cylindrical shape, said method comprising the steps of:

positioning said stator in a [housing] *structure external to said stator*;

pressing first and second winding forms against said first and second annular surfaces, respectively;

securing said first winding form to said [housing] *structure* in the position relative to said stator in which said first winding form is positioned in said pressing step; and securing said second winding form in the position relative to said stator in which said second winding form is positioned in said pressing step, wherein said pressing step includes the step of:

relatively pressing said first winding form against said first annular surface so that said method automatically adapts itself to various stator dimensions parallel to said longitudinal axis.

10. The method defined in claim 9 wherein said pressing step includes the step of:

moving said first winding form substantially parallel to said longitudinal axis in order to press said first winding form against said first annular surface.

11. The method defined in claim 10 wherein said step of securing said first winding form to said [housing] *structure* comprises the steps of:

providing clamp means movable relative to said [housing] *structure* substantially parallel to said longitudinal axis;

moving said clamp means with said first winding form as said first winding form is moved to press it against said first annular surface; and latching said clamp means in the position parallel to said longitudinal axis to which said clamp means is moved during said step of moving said clamp means.

12. The method defined in claim 11 wherein said first winding form includes a latching surface transverse to said longitudinal axis, wherein said clamp means includes a clamp member movable relative to said [housing] *structure* transverse to said longitudinal axis, and wherein said step of securing said first winding form to said [housing] *structure* further comprises the step of:

moving said clamp member transverse to said longitudinal axis to cause said clamp member to engage said latching surface.

13. The method of winding an electric motor stator of hollow, substantially cylindrical shape, said stator having a central longitudinal axis and first and second annular surfaces substantially perpendicular to said longitudinal axis at respective opposite ends of the cylindrical shape, said method comprising the steps of:

positioning said stator in a housing;

moving first and second winding form delivery means respectively including first and second winding forms toward said first and second annular surfaces in order to press said first and second winding forms against said first and second annular surfaces, respectively;

securing said first and second winding forms in the positions relative to said stator in which said first and second winding forms are positioned in said pressing step;

releasing said first and second winding *forms from said first and second winding* form delivery means;

winding said stator;

re-engaging said first and second winding forms with said first and second winding form delivery means;

releasing said first and second winding forms from the positions in which said first and second winding forms are secured in said securing step;

moving said first and second winding form delivery means and said first and second winding forms away from said stator; and removing said stator from said housing, wherein said step of securing said first and second winding forms comprises the step of securing said first winding form to said housing.

14. The method defined in claim 13 wherein said step of securing said first winding form to said housing comprises the step of causing a clamp member to extend transverse to said longitudinal axis from said housing into an aperture in said first winding form.

15. Apparatus for winding an electric motor stator of hollow, substantially cylindrical shape, said stator having a central longitudinal axis and first and second annular surfaces substantially perpendicular to said longitudinal axis at respective opposite ends of the cylindrical shape, said apparatus comprising:

a *structure external to said stator and including a* housing for holding said stator;

means for positioning a stator in said housing;

means for moving first and second winding form delivery means respectively including first and second winding forms toward said first and second annular surfaces in order to press said first and second winding forms against said first and second annular surfaces, respectively;

first means mounted on said [housing] *structure* for releasably securing said first winding form in the position relative to said stator in which said means for moving presses said first winding form against said first annular surface;

second means mounted on said [housing] *structure* for releasably securing said second winding form in the position relative to said stator in which said means for moving presses said second winding form against said second annular surface, said first and second means being movable relative to one another substantially parallel to said longitudinal axis so that said apparatus automatically adjusts to various stator dimensions parallel to said longitudinal axis;

means for releasing said first and second winding forms from said first and second winding form delivery means;

means for winding said stator;

means for re-engaging said first and second winding forms with said first and second winding form delivery means;

means for releasing said first and second winding forms from the positions in which said first and second winding forms are secured by said first and second means;

means for moving said first and second winding form delivery means and said first and second winding forms away from said stator; and means for removing said stator from said housing.

*16. The apparatus defined in claim 1 wherein said structure includes a housing for holding said stator, said wherein said second means is mounted on said housing.*

*17. The method defined in claim 9 wherein said structure includes a housing for holding said stator, and wherein said step of securing said first winding form comprises securing said first winding form to said housing.*

*18. The apparatus defined in claim 15 wherein said first means and second means are mounted on said housing.*

*19. The apparatus defined in claim 1 wherein said structure includes a housing for holding said stator and said apparatus further comprises:*

*a table mounted for rotation about a first substantially vertical axis, wherein said housing is mounted on said table;*

*first, second, and third stations spaced from one another around said table; and*

*means for selectively rotating said table about said first axis so that said table moves relative to said first, second, and third stations.*

*20. The method defined in claim 9 wherein said structure includes a housing for holding said stator and said method further comprises the steps of:*

*providing a table mounted for rotation about a first substantially vertical axis;*

*providing a first station and a second station spaced from one another around said table, wherein said first station is a stator loading and unloading station and wherein said second station is a stator winding station; and*

*providing the housing on the periphery of said table, said housing being adapted to receive and hold a stator at said first station and to hold the stator so that it is wound at the winding station with its longitudinal axis oriented substantially horizontal.*

*21. The apparatus defined in claim 15 further comprising:*

*a table mounted for rotation about a first substantially vertical axis, wherein said housing is mounted on said table;*

*first, second, and third stations spaced from one another around said table; and*

*means for selectively rotating said table about said first axis so that said table moves relative to said first, second, and third stations.*

*22. A machine for winding a plurality of stators, each having a hollow, substantially cylindrical shape, an associated longitudinal axis, and first and second annular surface substantially perpendicular to said longitudinal axis at respective opposite ends of the cylindrical shape, said first and second annular surfaces defining a respective stator core height, said machine comprising:*

*a table mounted for rotation about a first substantially vertical axis;*

*first, second, and third stations spaced from one another around said table;*

*means for selectively rotating said table about said first axis so that said table moves relative to said first, second, and third stations;*

*a plurality of stator supports spaced around the periphery of said table, each stator support being adapted to receive and hold a stator;*

*a first pair of clamping members for clamping a first winding form to one of said stators held in a respective stator support;*

*a second pair of clamping members for clamping a second winding form to said one of said stators; and*

*means responsive to the core height of said one of said stators for automatically moving said second pair of clamping members relative to said first pair of clamping members and substantially parallel to said longitudinal axis of said one of said stators so that said machine is able to automatically accommodate a plurality of stators having different core heights.*

*23. The machine defined in claim 22 wherein said first station includes a means for winding said plurality of stators and wherein said second station includes a means for terminating said plurality of said stators.*

*24. The machine defined in claim 23 having four stator supports equally spaced around the periphery of said table.*

*25. The machine defined in claim 24 wherein said first pair of clamping members clamps said first winding form to said first annular surface of said one stator and said second pair of clamping members clamps said second winding form to said second annular surface of said one stator.*

*26. A method for winding a plurality of stators, each having a hollow, substantially cylindrical shape, an associated longitudinal axis, and first and second annular surfaces substantially perpendicular to said longitudinal axis at respective opposite ends of the cylindrical shape, said first and second annular surfaces defining a respective stator core height, said method comprising the steps of:*

*providing a table mounted for rotation about a first substantially vertical axis;*

*providing a first station and a second station spaced from one another around said table, wherein said first station is a stator loading and unloading station and wherein said second station is a stator winding station;*

*providing a plurality of stator supports spaced around the periphery of said table, each stator support being adapted to receive and hold a stator at said first station and to hold the stator so that it is wound at the winding station with its longitudinal axis oriented substantially horizontal;*

*providing a first pair of clamping members for clamping a first winding form to said plurality of stators;*

*providing a second pair of clamping members for clamping a second winding form to said plurality of stators;*

*sensing the core height of each of said plurality of stators; and*

*moving said second pair of clamping members relative to said first pair of clamping members and substantially parallel to said longitudinal axis of each of said plurality of stators by an amount dependent on the core height sensed in said sensing step so that said machine is able to automatically accommodate a plurality of stators having different core heights.*

*27. The method defined in claim 26 wherein said step of providing a plurality of stator supports includes the step of providing four stator supports equally spaced around the periphery of said table.*

*28. The method defined in claim 27 wherein said step of clamping said first winding form to said plurality of stators includes the step of clamping said first winding form to said first annular surfaces of said plurality of stators and said step of clamping said second winding form to said plurality of stators includes the step of clamping said second winding form to said second annular surfaces of said plurality of stators.*

*29. Apparatus for use in winding an electric motor stator of hollow, substantially cylindrical shape, said stator having a central longitudinal axis and first and second axial ends adjacent respective opposite ends of said cylindrical shape, said apparatus comprising:*

*first means external to said stator for supporting said stator;*

*second means for sensing the location of said first axial end relative to said second axial end substantially parallel to said longitudinal axis; and*

*third means responsive to said means for sensing for positioning a winding form at a predetermined location relative to said first axial end substantially parallel to said longitudinal axis and for holding said winding form at said predetermined location, said third means being mounted on said first means.*

*30. Apparatus for use in winding an electric motor stator of hollow substantially cylindrical shape, said stator having*

*a central longitudinal axis and first and second axial ends adjacent respective opposite ends of said cylindrical shape, said apparatus comprising:*

*means external to said stator for supporting said stator;*

*means for positioning a winding form at a predetermined location relative to said first axial end;*

*means mounted on said means for supporting for holding said winding form at said predetermined location; and*

*means for automatically moving said means for holding substantially parallel to said longitudinal axis so that said apparatus adjusts to various stator dimensions parallel to said longitudinal axis.*

* * * * *